United States Patent [19]
Ueda et al.

[11] Patent Number: 5,956,471
[45] Date of Patent: *Sep. 21, 1999

[54] PRINTING APPARATUS AND PRINTING METHOD WITH SECURITY PROTECTION FOR CONFIDENTIAL DATA

[75] Inventors: Shigeru Ueda, Wako; Minoru Kanbegawa, Komae, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/963,985

[22] Filed: Nov. 4, 1997

Related U.S. Application Data

[63] Continuation of application No. 08/343,869, Nov. 17, 1994, abandoned.

[30] Foreign Application Priority Data

Dec. 1, 1993 [JP] Japan .................................. 5-302025
Dec. 1, 1993 [JP] Japan .................................. 5-302029

[51] Int. Cl.⁶ .............................. B41B 15/00; H04N 1/00
[52] U.S. Cl. ......................... 395/113; 395/116; 358/403; 358/402; 358/407; 380/23; 380/55; 340/825.34; 340/825.54
[58] Field of Search .................................. 395/113, 112, 395/114–117, 101, 834, 835, 874; 358/440, 402, 407, 403, 438, 444, 468, 434; 380/18, 21, 51, 23.55; 340/825.34, 825.54, 825.3

[56] References Cited

U.S. PATENT DOCUMENTS

| | | | |
|---|---|---|---|
| 4,843,571 | 6/1989 | Notermans et al. | 395/117 |
| 5,077,795 | 12/1991 | Rourke et al. | 380/55 |
| 5,130,818 | 7/1992 | Tadokoro | 358/402 |
| 5,224,156 | 6/1993 | Fuller et al. | |
| 5,261,000 | 11/1993 | Hamamoto | 380/23 |
| 5,283,665 | 2/1994 | Dgata | 358/402 |
| 5,351,136 | 9/1994 | Wu et al. | 358/407 |
| 5,353,124 | 10/1994 | Chou et al. | 358/407 |
| 5,386,303 | 1/1995 | Kihara | 358/453 |
| 5,452,099 | 9/1995 | Von Meister | 358/407 |
| 5,513,126 | 4/1996 | Harkins et al. | 358/402 |

FOREIGN PATENT DOCUMENTS

| | | |
|---|---|---|
| 0 208 342 | 1/1987 | European Pat. Off. |
| 36 21 543 | 1/1987 | Germany. |

OTHER PUBLICATIONS

Mastering WordPerfect® 5.1 & 5.2 For Windows™, Alan Simpson, 1993 SYBEX Inc. pp. 408–411.
Patent Abstracts of Japan, vol. 007, No. 258 (E–211), Nov. 17, 1983 & JP 58–142664 (Fujitsu KK), Aug. 24, 1983.
Patent Abstracts of Japan, vol. 009, No. 281 (P–403), Nov. 8, 1985 & JP 60–122427 (Hitachi Seisakusho KK), Jun. 29, 1985.
Patent Abstracts of Japan, vol. 016, No. 286 (P–1376), Jun. 25, 1992 & JP 04–075128 (Fuji Xerox Co. Ltd.), Mar. 10, 1992.
Patent Abstracts of Japan, vol. 016, No. 580 (P–1461), Dec. 18, 1992 & JP 04–227525 (Fuji Xerox Co. Ltd.), Aug. 17, 1992.
Patent Abstracts of Japan, vol. 017, No. 664 (M–1523) Dec. 8, 1993 & JP 05–221089 (Canon Inc.), Aug. 31, 1993.

*Primary Examiner*—Dwayne D. Bost
*Assistant Examiner*—Tracy M. Legree
*Attorney, Agent, or Firm*—Fitzpatrick, Cella, Harper & Scinto

[57] ABSTRACT

The present invention provides a technique which can protect security of data until a regular user who transmits print data directs to start printing on the side of a printing apparatus even in an environment where a plurality of host computers on a network use a common printing apparatus, and which can print image data which has already been produced, as it is after the user gives instructions to start printing.

54 Claims, 13 Drawing Sheets

FIG. 6(a)

E - MAIL WAS RECEIVED.
ADDRESS : YAMAMOTO
INPUT PASSWORD : ___

FIG. 6(b)

E - MAIL WAS RECEIVED.
ADDRESS : YAMAMOTO, TANAKA, SUZUKI
INPUT USER NAME AND PASSWORD
USER NAME : ___
PASSWORD

PRINTING APPARATUS AND PRINTING METHOD WITH SECURITY PROTECTION FOR CONFIDENTIAL DATA

This application is a continuation of application Ser. No. 08/343,869, filed Nov. 17, 1994, now abandoned.

BACKGROUND OF THE INVENTION

1. Field of the Invention

The present invention relates to a printing apparatus and a printing method in which text data is received from host computers on a network and then printed.

2. Description of the Related Art

In a conventional system employing a network, when electronic mail data is received, a password is invariably verified. Since only the user licensed to see data can access data requiring security protection, this system is excellent for security protection of data.

On the other hand, when it is assumed that the above data is to be printed, a printer shared by a number of users is frequently used. In this case, even if the process of verifying a password is performed, when the operator who directs output of the data is not present at the printer station, the print output of the data requiring security is delivered onto a delivery tray or delivery base, thereby creating a condition where a third person can easily see the data.

Such a system thus has the potential problem of the output print itself being delivered from the printer even if the process for security protection of data is performed, as described above.

In order to avoid the possibility that output data can be seen by an unauthorized person, it is considered that a common printer not be used, and that a personal printer be dedicated for receipt of secure data. However, this has not only the problem of compelling a great economic load but also the problem of occupying a limited space.

There is also the problem that when the data requiring security is output, the operator who gives directions to output the data must always move to the location where the printer is installed, and is thus has a heavier workload.

In the typical example, since the transmitted text data is output immediately after being received by a printing apparatus, there is further the problem that text data which must not be seen by other users cannot be output, particularly, in those cases where the user is at a distance from the printing apparatus.

SUMMARY OF THE INVENTION

The present invention has been achieved for solving the above problems. It is an object of the present invention to provide a printing apparatus in which the start of output by the printer engine, the output order and a face-down option are controlled based on the received document data on which a decision is made as to whether data for correlation and verification is added, so that it is possible to prevent the document data requiring security protection from being freely printed, efficiently print subsequent document data without hindrance, and output the data face-down.

It is another object of the present invention to provide a printing apparatus in which an output destination of the image data produced in accordance with output limiting data contained in the received print data is controlled so that the instructions to start output of the print data transmitted from a host computer can be entrusted to the regular user alone on the side of the printing apparatus, thereby performing print processing with high security.

One aspect of the present invention comprises decision means for deciding whether or not predetermined data for correlation and verification is added to the received document data, demand means for causing an operating display to demand the input of predetermined correlation data when the decision means detects that predetermined data for comparison, transfer means for transferring, to a host device, the correlation data input from the operating display in accordance with the demand from the demand means, and control means for controlling the start of printing of the document data on the basis of the correlation result obtained from the host device for the correlation data transferred from the transfer means.

Another aspect of the present invention comprises control means for controlling the transfer order of the produced image data so that when the decision means decides that the predetermined data for correlation and verification is not added to the text data subsequently received, the image data produced on the basis of the text data subsequently received is preferentially output to a printer engine.

In still another aspect of the present invention control means is provided for controlling face-up or face-down output on the printing surface of a recording medium on the basis of the decision result obtained from decision means.

Yet another aspect of the present invention comprises production means for producing image data on the basis of the print data received from any one of host computers, external storage means for storing the image data output from the production means, a printer engine for printing on the basis of the image data, and switching means for switching the external storage means and the printer engine as a destination of transfer of the image data produced on the basis of output limiting data contained in the print data.

In still another aspect of the present invention there comprises storage means for storing user data for identifying the user, input means for inputting predetermined data, correlation means for correlating the user data stored in the storing means with the data input from the input means, and control means for controlling the start of transmission of image data to a printer engine from the external storage means on the basis of the correlation result obtained from the correlation means.

These and other objects will become apparent in view of the following detailed description.

BRIEF DESCRIPTION OF THE DRAWINGS

FIGS. 6(a) and 6(b) are drawings illustrating a message displayed on a screen of the operating part shown in FIG. 5;

DESCRIPTION OF THE PREFERRED EMBODIMENTS

Before an embodiment of the present invention is described, a laser beam printer and an ink jet printer which are suitable for applying the present invention are described with reference to FIGS. 1 to 3. The printer used in the embodiment is not limited to the laser beam printer or the ink jet printer, and other types of printers may be used.

Figure 1:
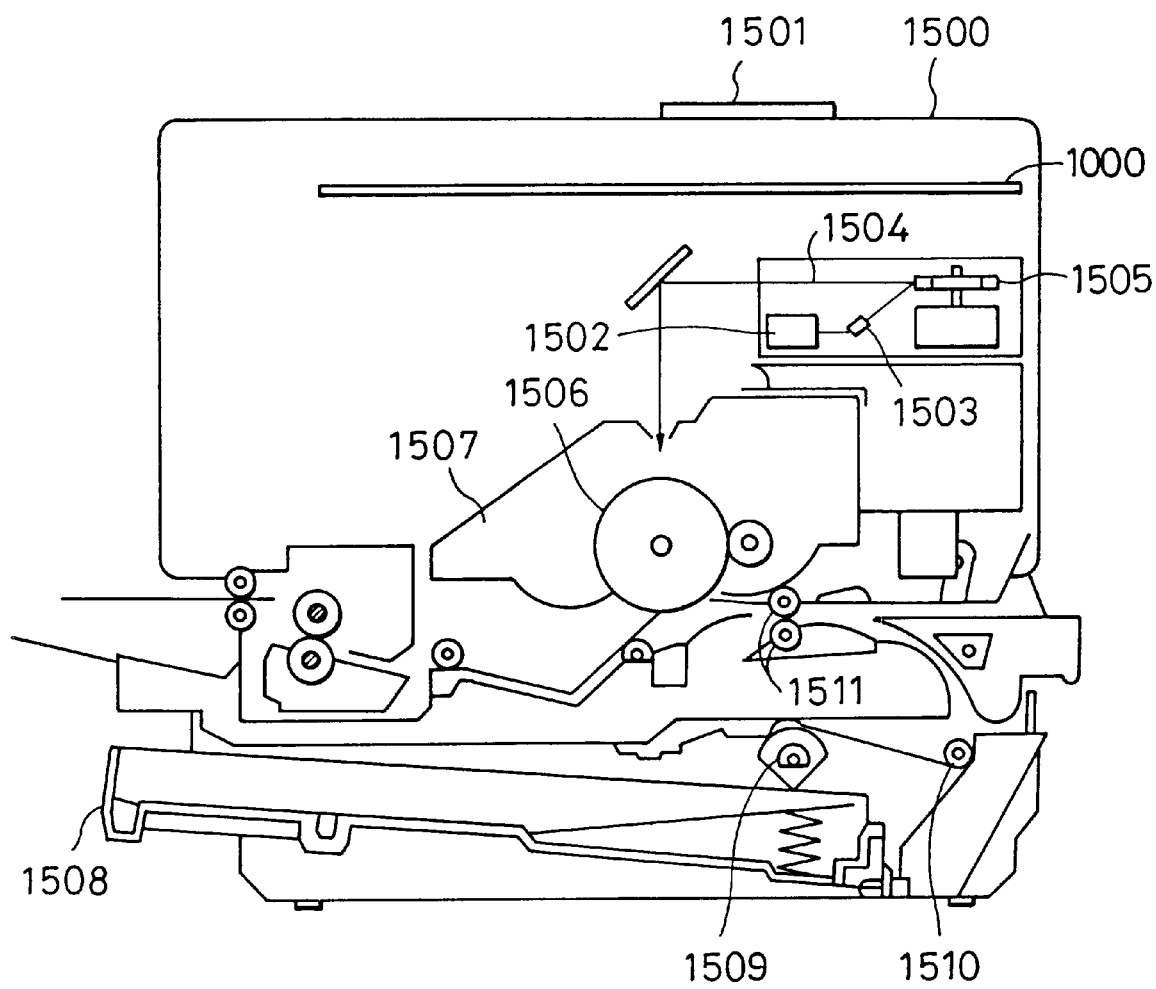
FIG. 1 is a sectional view illustrating the construction of a first output apparatus to which the present invention can be applied.

FIG. 1 is a sectional view illustrating the construction of a first printing apparatus, for example, a laser means printer (LBP), to which the present invention can be applied.

In FIG. 1, reference numeral 1500 denotes a LBP for inputting and storing print data (character code, etc.), form data, macro instructions and so on, which are supplied from an external host computer connected thereto, forming a character pattern or form pattern corresponding to the above data, and forming an image on a recording sheet as a recording medium. Reference numeral 1501 denotes a console panel on which operating switches and LED displays are disposed, and reference numeral 1000 denotes a printer control unit for controlling the LBP 1500 and analyzing character data supplied from the host computer. The printer control unit 1000 converts character data into a video signal comprising a corresponding character pattern and outputs the signal to a laser driver 1502. The laser driver 1502 is a circuit for driving a semiconductor laser 1503 by turning-on and off of a laser beam 1504 emitted from the semiconductor laser 1503 in accordance with the video signal input thereto. The laser beam 1504 is laterally deflected by a rotating polygon mirror 1505 for scanning exposure of an electrostatic drum 1506. This forms an electrostatic latent image of a character pattern on the electrostatic drum 1506. This latent image is developed by a development unit 1507 disposed around the electrostatic drum 1506, and then transferred to the recording sheet. A cut sheet is used as the recording sheet, and the cut sheet recording paper is contained in a paper cassette 1508 mounted on the LBP 1500, introduced into the apparatus by a feed roller 1509 and conveyance rollers 1510 and 1511, and then supplied to the electrostatic drum 1506. The LBP 1500 is provided with at least one card slot (not shown) so that in addition to the contained fonts, an option font card and a control card (emulation card) having a different language system can be connected to the LBP 1500.

Figure 2:
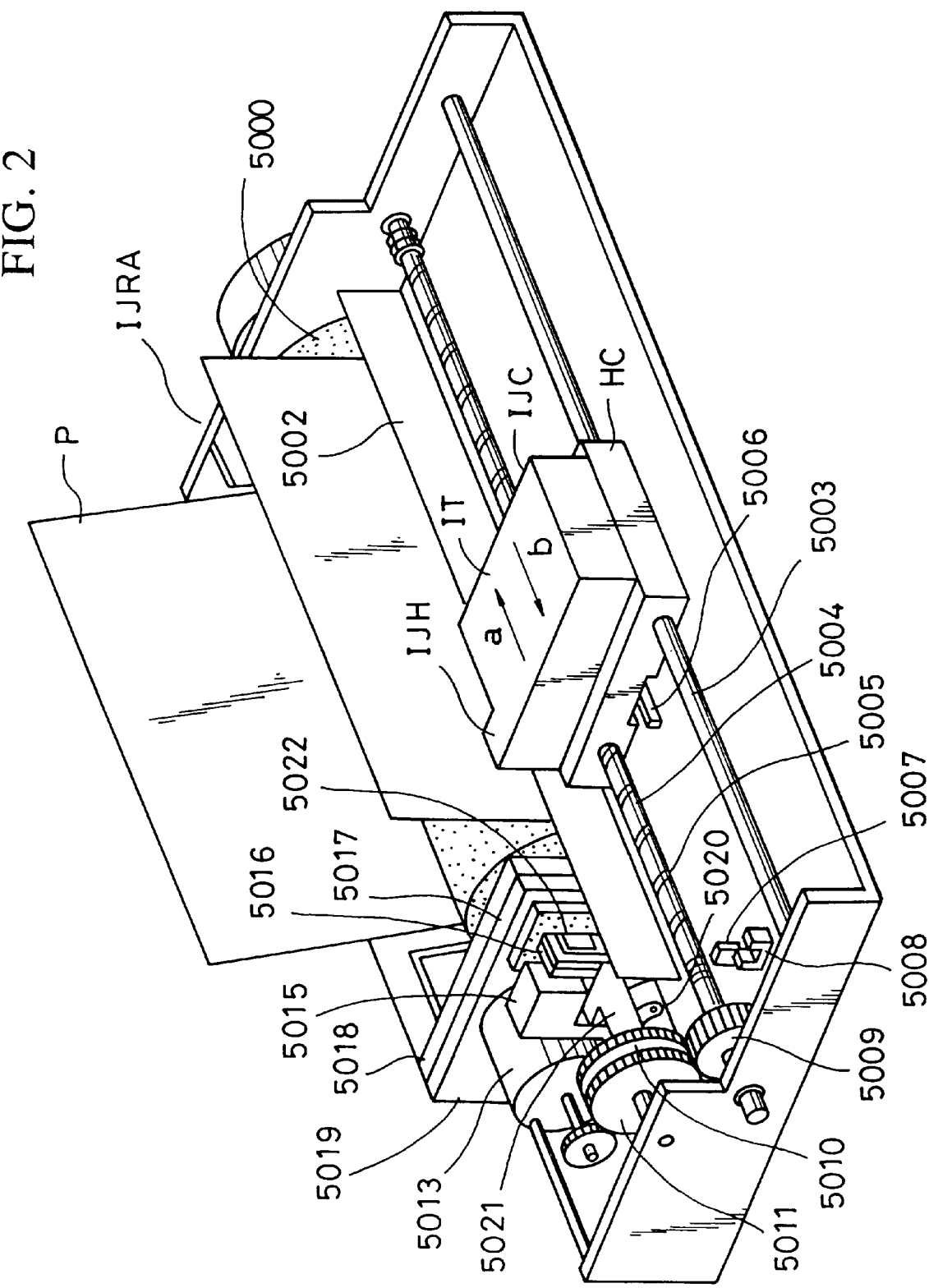
FIG. 2 is a perspective view illustrating the construction of a second output apparatus to which the present invention can be applied.

FIG. 2 is a perspective drawing illustrating the construction of a second printing apparatus, for example, an ink jet recording apparatus (IJRA), to which the present invention can be applied.

In FIG. 2, a lead screw 5005 is rotated through driving force transmitting gears 5011 and 5009 in linkage with the normal and reverse rotations of a driving motor 5013, and a carriage HC which engages a helical groove 5004 of the lead screw 5005 has a pin (not shown) so as to be reciprocated in directions of arrows a and b. An ink jet cartridge IJC is mounted on the carriage HC. Reference numeral 5002 denotes a paper presser plate for pressing paper on platen 5000 in the direction of movement of the carriage. Reference numerals 5007 and 5008 each denote a photocoupler serving as home position detection means for confirming the presence of a lever 5006 of the carriage HC within the region of the home position and signaling to switch the direction of rotation of a motor 5013. Reference numeral 5016 denotes a member for directing a capping member to cap the whole surface of a recording head, and reference numeral 5015 denotes suction means for sucking the contents in the cap for suction recovery of the recording head through an opening 5022 in the cap. Reference numeral 5017 denotes a cleaning plate which can be moved forwardly and backwardly by a member 5019. Reference numeral 5018 denotes a body supporting plate for supporting the cleaning plate 5017 and the member 5019. Reference numeral 5021 is a lever which is moved with the movement of a cam 5020 engaging the carriage HC so as to start the suction for suction recovery, the movement being controlled by switching known transmission means such as a clutch or the like for transmitting the driving force from the driving motor 5013.

The capping, cleaning and suction recovery operations are set to perform desired processing at the corresponding positions by the operation of the lead screw 5005 when the carriage HC is within the home position region. However, these operations may be set to perform the desired processing in known timing.

Figure 3:
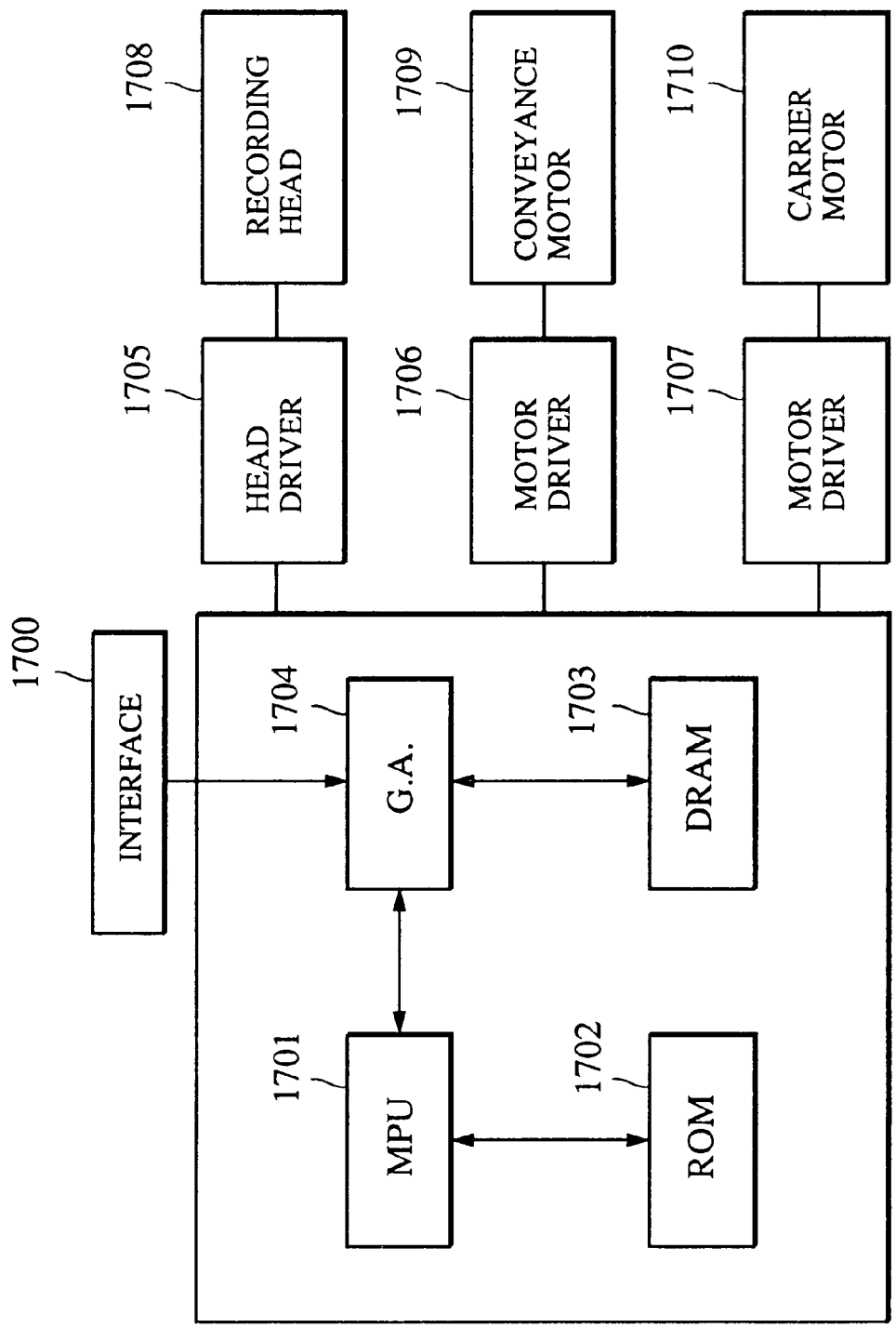
FIG. 3 is a block diagram illustrating the configuration for control of the second output apparatus shown in FIG. 2.

FIG. 3 is a block diagram illustrating the configuration for control of the printing apparatus shown in FIG. 2.

In FIG. 3, reference numeral 1700 denotes an interface for inputting record signals, reference numeral 1701, MPU; reference numeral 1702, ROM for storing a control program executed by the MPU 1701; and reference numeral 1703, DRAM for storing various items of data (the record signals, record signals to be supplied to a head and so on). Reference numeral 1704 denotes a gate array for controlling the supply of output data to a recording head 1708 and controlling the transfer of data between the interface 1700, the MPU 1701 and the DRAM 1703. Reference numeral 1710 denotes a carrier motor for conveying the recording head 1708; reference numeral 1709, a conveyance motor for conveying recording paper; reference numeral 1705, a head driver for driving the recording head; reference numeral 1706, a motor driver for driving the conveyance motor 1709; and reference numeral 1707, a motor driver for driving the carrier motor 1710.

In the printing apparatus constructed as described above, when data is input from a host computer, which will be described below, through interface 1700, the input data is converted into output data between gate array 1704 and MPU 1701. The motor drivers 1706 and 1707 are then driven, and the recording head is driven to print an image in accordance with the output data supplied to the head driver 1705.

Figure 4:
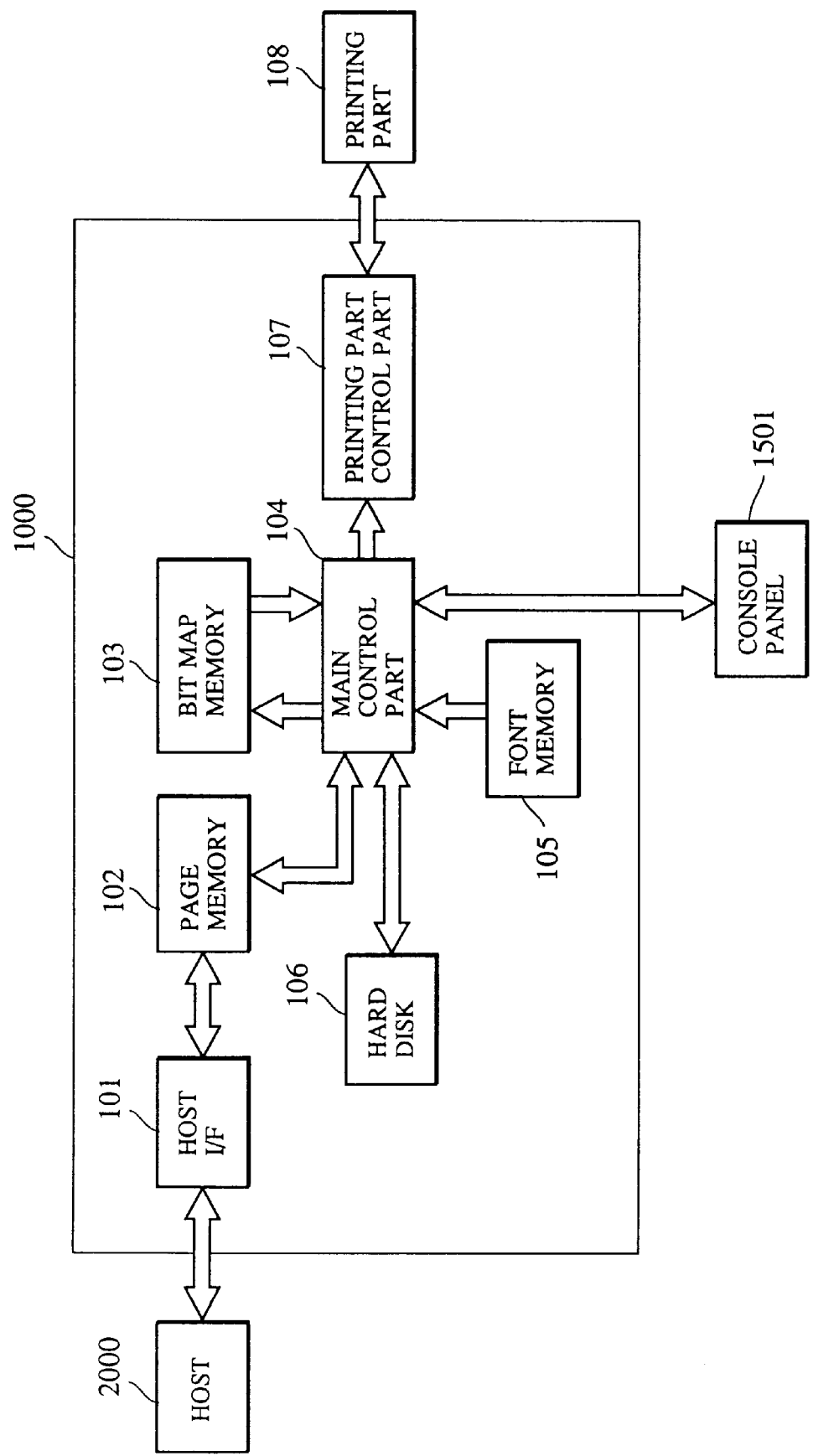
FIG. 4 is a block diagram illustrating the configuration for control of a printing apparatus in accordance with an embodiment of the present invention.

FIG. 4 is a block diagram illustrating the construction of a controller for control of a printing apparatus in accordance with a first embodiment of the present invention. The block diagram of the first embodiment shown in FIG. 4 is described in detail below with reference to FIG. 1 showing a laser beam printer.

In FIG. 4, reference numeral 1000 denotes a printer control unit comprising a host I/F 101, a page memory 102, a bit map memory 103, a main control part 104, a font memory 105, a hard disk 106, and a printing part controlling part 107, which will be described below. Reference numeral 108 denotes a printing part (printer engine part), and reference numeral 1501 denotes a console panel serving as an operating part. Although the printer engine part 108 employs an electrophotographic method for printing, the use of the ink jet method shown in FIG. 2 causes no interference with application of the present invention and may be substituted.

In the printing apparatus described above, when a demand for inputting predetermined correlation data is given to the operating part 1501 on the basis of the decision result obtained from the main control part 104 comprising CPU, RAM used as a work memory and ROM for storing a program, which are not shown in FIG. 4, the correlation data input from the operating part 1501 in accordance with the demand is transmitted to the host computer 2000, and the main control part 104 controls the start of printing of text data on the basis of the correlation result which is obtained from the host computer 2000 for the transmitted correlation data. When text data with the correlation verification data is received, the main control part 104 controls printing so as to positively prevent the data from being freely printed until it is decided on the side of the host computer 2000 that the user giving instructions to transmit the information inputs suitable correlation data from the printing apparatus receiving the text data.

Figure 7:
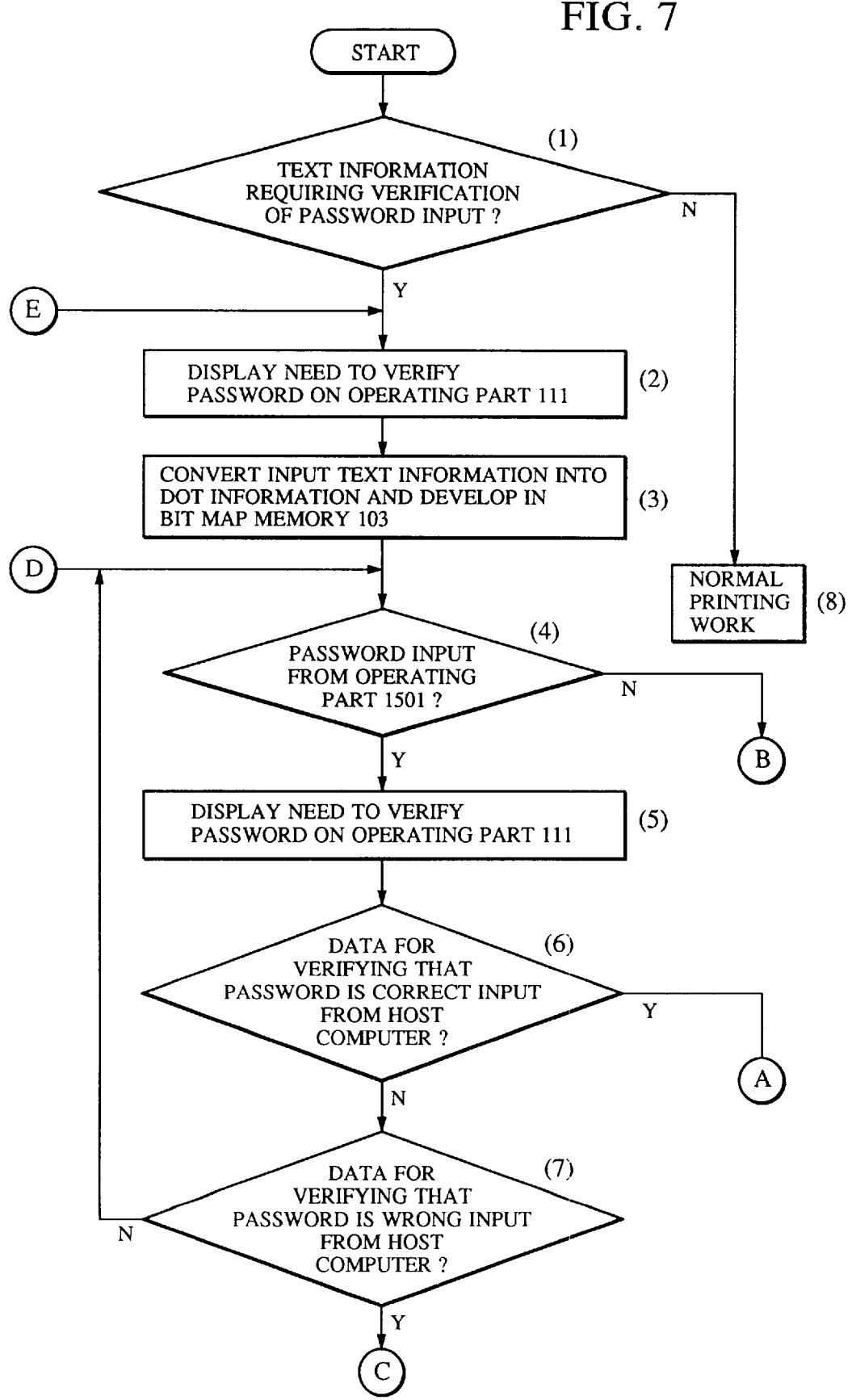
FIG. 7 is a flowchart illustrating an example of the procedure for controlling password printing in a printing apparatus in accordance with the present invention.
Figure 8A:
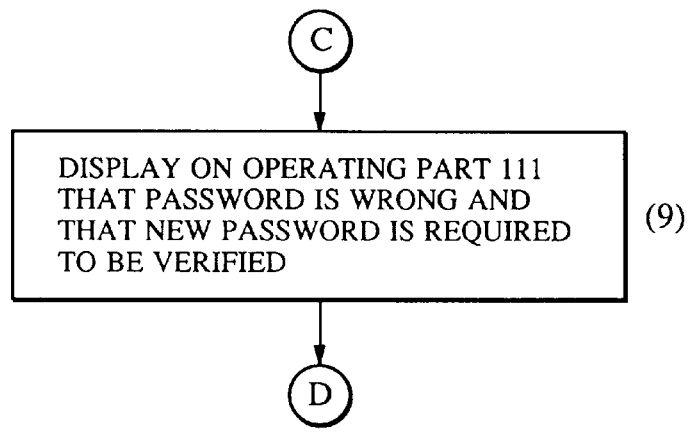
FIGS. 8(a) and 8(b) are flowcharts illustrating an example of the procedure for controlling password printing in a printing apparatus in accordance with the present invention.
Figure 8B:
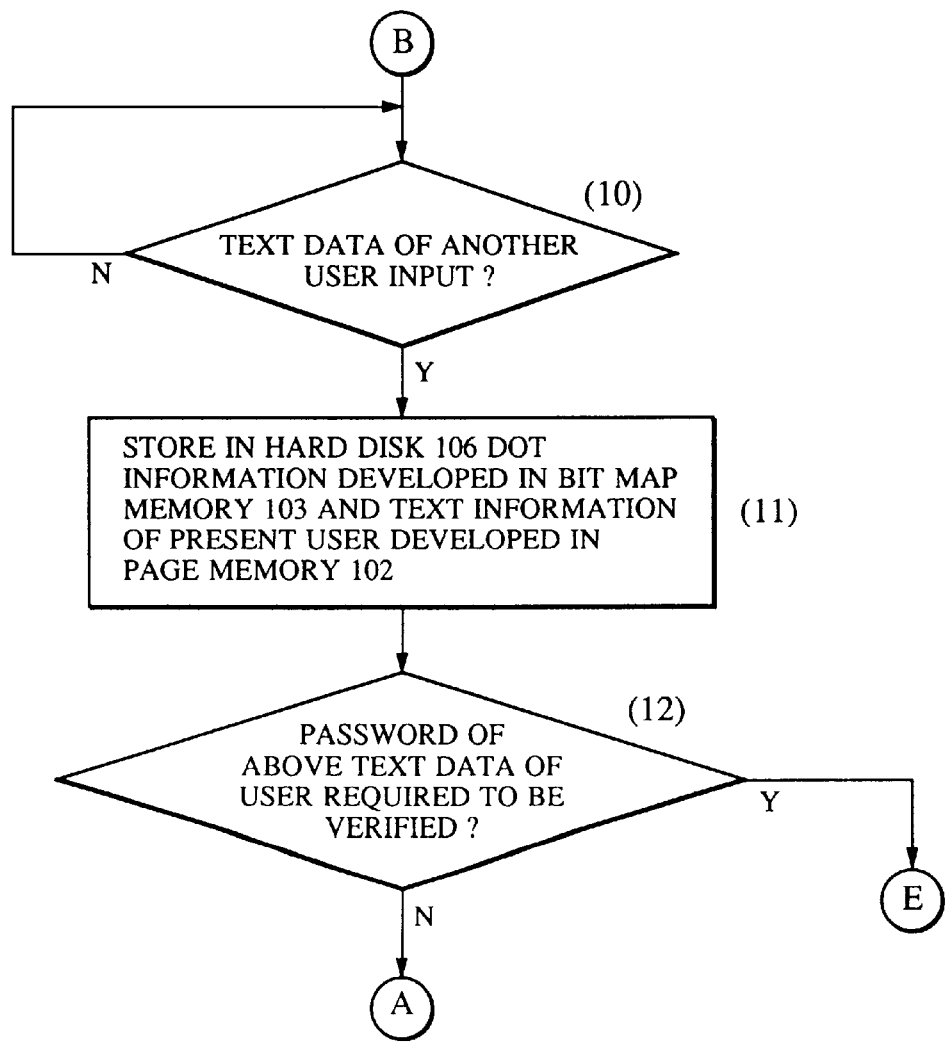
Figure 9:
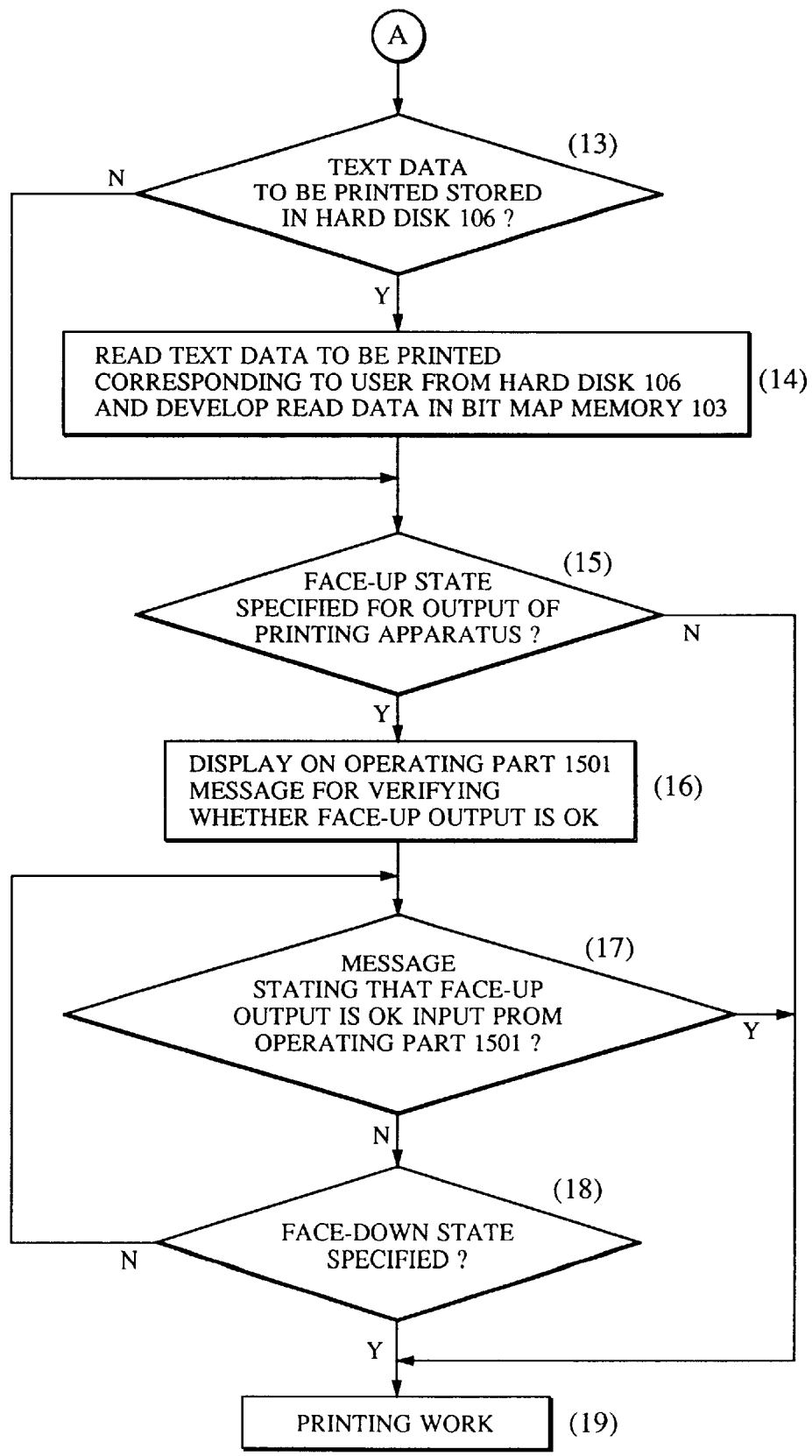
FIG. 9 is a flowchart illustrating an example of the procedure for controlling password printing in a printing apparatus in accordance with the present invention.

When it is decided that the predetermined correlation verification data is not added to the text data subsequently received in accordance with the flowcharts shown in FIGS. 7, 8 and 9, which will be described below, the main control part 104 controls the order of transfer of the produced image data so that the image data produced on the basis of the text data subsequently received is preferentially output to the printer engine part 108. When text data having no need for correlation is successively received from the host computers 2000, the text data is printed in preference to text data requiring correlation, without establishing the printing standby state. The control programs shown in the flowcharts in FIGS. 7, 8 and 9 are stored in the ROM (not shown) of the main control part 104.

The main control part 104 controls face-up or face-down output with respect to the printing surface of the recording medium on the basis of the decision result. When text data requiring correlation is printed, the recording paper is always delivered in the face-down state.

Specifically, the text data transmitted from an external device is sent to the page memory 102 (comprising RAM) through the host I/F 101. When data for at least one page is stored in the page memory 102, the CPU of the main control part 104 successively reads data from the page memory 102, converts the data into dot data by referring to the font memory 105 and develops the dot data in the bit map memory 103. When the dot data for one page is completely developed in the bit map memory 103, the CPU of the main control part 104 successively reads the dot data from the bit map memory 103 and transmits the data to the printing part controlling part 107.

The printing part controlling part 107 converts the dot data into serial data synchronously with the horizontal or vertical synchronous signal output from the printing part 108, and transmits the data to the printing part 108 to print the data.

A description will now be made of the operation when text data requiring verification of a password with reference to FIGS. 5, 6, 7, 8 and 9.

Figure 5A:
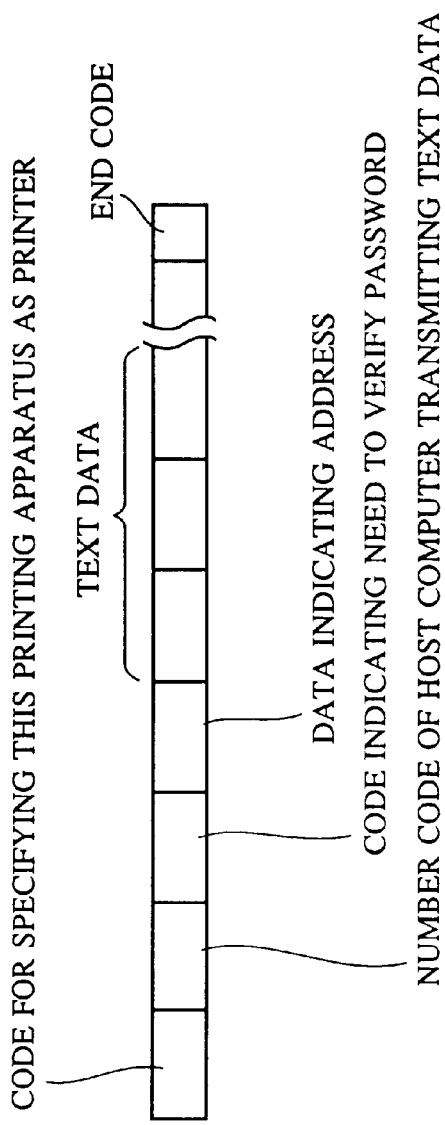
FIGS. 5(a) and 5(b) are drawings illustrating the data structure of the text data received by the printing apparatus shown in FIG. 4 from an external device, and the structure of password correlation request data.
Figure 5B:
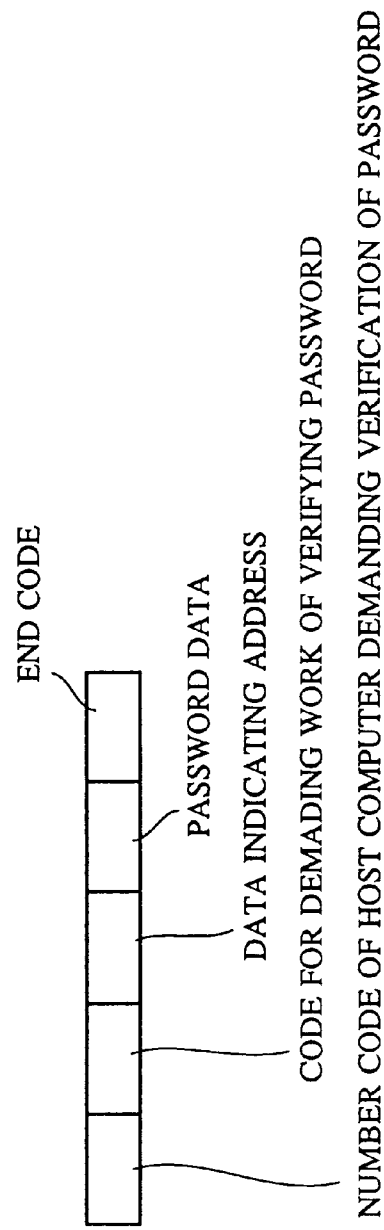

FIG. 5 is a drawing illustrating the data structure of the text data received by the printing apparatus shown in FIG. 4 from the host computer 2000, and the structure of password correlation request data. FIG. 5(a) shows received data and FIG. 5(b) shows transmit data.

FIG. 6 is a drawing illustrating messages displayed on a LED display screen of the operating part 1501.

FIGS. 7 to 9 are flowcharts illustrating the procedure for password printing control of a printing apparatus in accordance with the present invention.

Numerals (1) to (19) Each Indicate a Step

Text data having the structure shown in FIG. 5(a) is transmitted from the host computer 2000. The CPU decides whether or not the input text data requires verification of a password (step 1). If the data requires no verification of the password, printing is immediately started (step 8). While if the text data requires the verification of the password, the need to verify the password is displayed on the operating part 1501, as shown in FIG. 6(a) (Step 2).

The input text data is converted into dot data, and then developed in the bit map memory 103 by the CPU, whether or not the password has been input (step 3).

If the password is input from the operating part 1501 (Step 4), the host computer 2000 is directed in the data form shown in FIGS. 5(b) to verify the password through the host I/F 101 in step 5. If data indicating that the input password is correct is input from the host computer 2000 (Step 6), the flow advances to step 13, and printing is started.

During printing, even in a printing apparatus which can output the delivered sheet in the face-up state, printing is inevitably performed in the face-down state, i.e., in the state where the print surface is turned down. This is because the security of the text data requiring the password must be protected as much as possible.

Next, the flow advances to Step 13 in which the CPU makes a decision as to whether or not the text data to be printed will be stored in hard disk 106. If no, the process proceeds to Step 15. If yes, the text to be printed is read and develop read data in bit map memory 103 (Step 14), and the process proceeds to Step 14.

When the face-up state is specified for output of the printing apparatus in step 15, the CPU displays, on the operating part 1501, the message for making sure the face-up state is OK (step 16). After the operator makes a decision in steps 17 and 18, the printing work is started in step 19 on the basis of the result of decision by the operator.

When a message indicating that the password input from the operating part 1505 is wrong is input from the host computer 2000 in step 7, the flow advances to step 9 for demanding the operator to input a password again, and the flow then returns to step 4. When text data of a next user is input from, for example, another host computer, in step 4, the flow advances to step 10. If the text data is input, the flow advances to step 11 in which the text data of the present user present in the bit map memory 103 and the page memory 102 is stored in the hard disk 106 to be saved, and the text data of the next user is input. The hard disk 106 may be detachable from the printing apparatus.

When the next user also decides in step 12 that verification of a password is required, the flow returns to step 2 for displaying the message shown in FIG. 6(b) on the operating part 1501 and demanding the verification of the password.

In this case, both the user name and the password must be input and verified, and the text data of the user for which the verification is completed is printed.

If the text data is stored in the hard disk 106, the text is read from the hard disk 106 and then printed.

When the input text data does not require the verification of a password, the flow advances to step 13 in which the CPU makes a decision as to whether or not the text data to be printed is stored in the hard disk (HD) 106. If the decision is NO, the flow advances to step 15. If the decision is YES, processing in steps 14 to 19 is executed, and the printing work is started. In this embodiment, the operating part 1501 may comprise a terminal or the like.

Although this embodiment comprises the hard disk 106 for storing the bit map data, other embodiments may comprise another storage device such as a flash memory, DRAM or the like.

Although, in this embodiment, the password is verified by the host computer 2000, a password may be contained in text data so that the password can be verified on the printer side.

The present invention can be applied to both a system comprising a plurality of apparatus and a system comprising a single apparatus. The present invention can also be applied when the invention is achieved by supplying a program to a system or an apparatus.

As described above, in accordance with the first embodiment of the present invention, the operating display demands input of predetermined correlation data on the basis of a decision by the decision means, the correlation data input at the operating display is transmitted to a host device by the transfer means, and the start of printing of the text data is controlled by the control means on the basis of the result obtained from the host device for the transferred correlation data so that when text data having correlation verification data is received, it is possible to securely prevent the data from being freely printed until the host side decides that the user giving instruction to transmit the data has input suitable correlation data from the printing apparatus which receives the text data.

In accordance with the second embodiment, when the decision means decides that the text data subsequently received does not have the predetermined correlation verification data, the control means controls the transfer order of the produced image data so that the image data produced on the basis of the text data subsequently received is preferentially output to the printer engine. When text data having no need for correlation is successively received from the host devices, the printing apparatus is not in the standby state, and the text data without the need for correlation can be printed in preference to text data requiring correlation.

In accordance with a third embodiment, the control means controls the face-up or face-down output on the printing surface of a recording medium on the basis of the decision by the decision means so that when text data requiring correlation is printed, the recording sheet can inevitably delivered in the face-down state.

Document data requiring security protection is thus securely prevented from being freely printed. It is also possible to efficiently print subsequent document data without hindrance, and output data in the face-down state.

Figure 10:
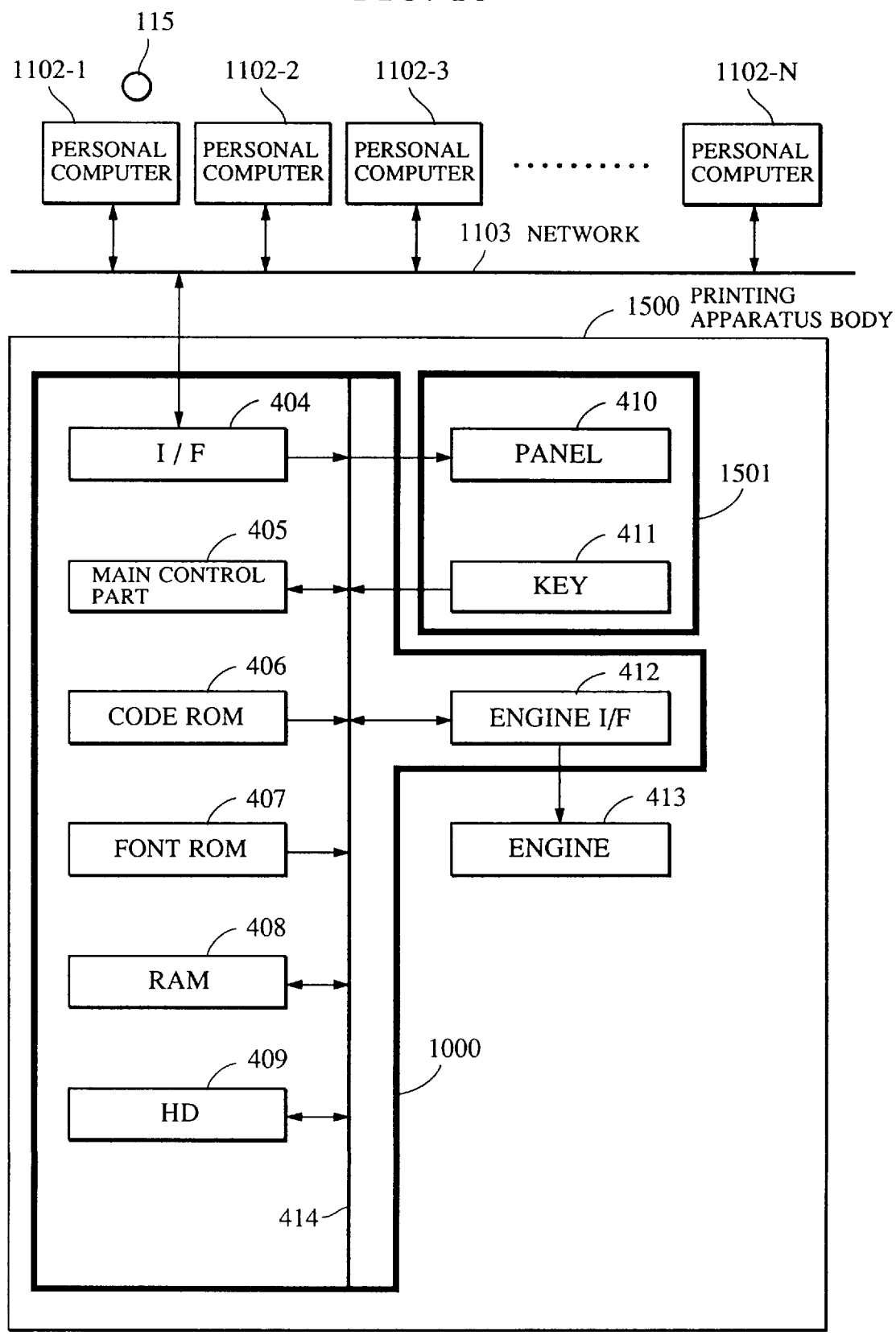
FIG. 10 is a block diagram illustrating the configuration for control of a printing apparatus in accordance with another embodiment of the present invention.

FIG. 10 is a block diagram illustrating the configuration for control of a printing apparatus in accordance with a second embodiment of the present invention. The block diagram of the second embodiment shown in FIG. 10 is described in detail below with reference to the laser beam printer shown in FIG. 1.

In FIG. 10, reference numerals 1102-1 to 1102-N each denote a host computer, reference numeral 115 denotes a user who is operating one of the host computers 1102-1 to 11-2-N, and reference numeral 1103 denotes a network to which the host computers including the printing apparatus 1500, are connected.

A printer control unit 1000 comprises an interface 404 for inputting text data from the network 1103, a main control part 405 comprising a CPU (not shown) and a program ROM, a code ROM 406, a font ROM 407 for storing fonts, a RAM 408 used for operating the main control part 405, a hard disk (HD) 409, a CPU bus 414 for transmitting data between the main control part 405 and each of the electric devices, and an engine interface 412 for mediating data transmission between the CPU bus 414 and the printing engine 413. Reference numeral 1501 denotes a console panel comprising a display panel 410 for transmitting data to the user, and a key panel for transmitting data to the printing apparatus from the user. Reference numeral 413 denotes the printing part (printer engine) for executing printing. In the printing apparatus configured as described above, the main control part 405 switches the destination of the produced image data to the HD 409 or the printer engine 413 on the basis of the output limiting data contained in print data so as to prevent the produced image data from disappearing or being unconditionally output even when the print data is received from the host computer to produce the image data.

Further, since the main control part 405 correlates the user data stored in the RAM 408 or the HD 409 with the password input from the key panel 411 and controls the start of transfer of the image data to the printer engine 413 from the HD 409 on the basis of the correlation result, it is possible to securely prevent printing of the stored image data until the regular user inputs, on the printer side, data indicating the start of output of the stored data which has already been produced and not output.

The operation of controlling security output of a printing apparatus in accordance with the present invention is described below with reference to the flowchart shown in FIG. 11.

Figure 11:
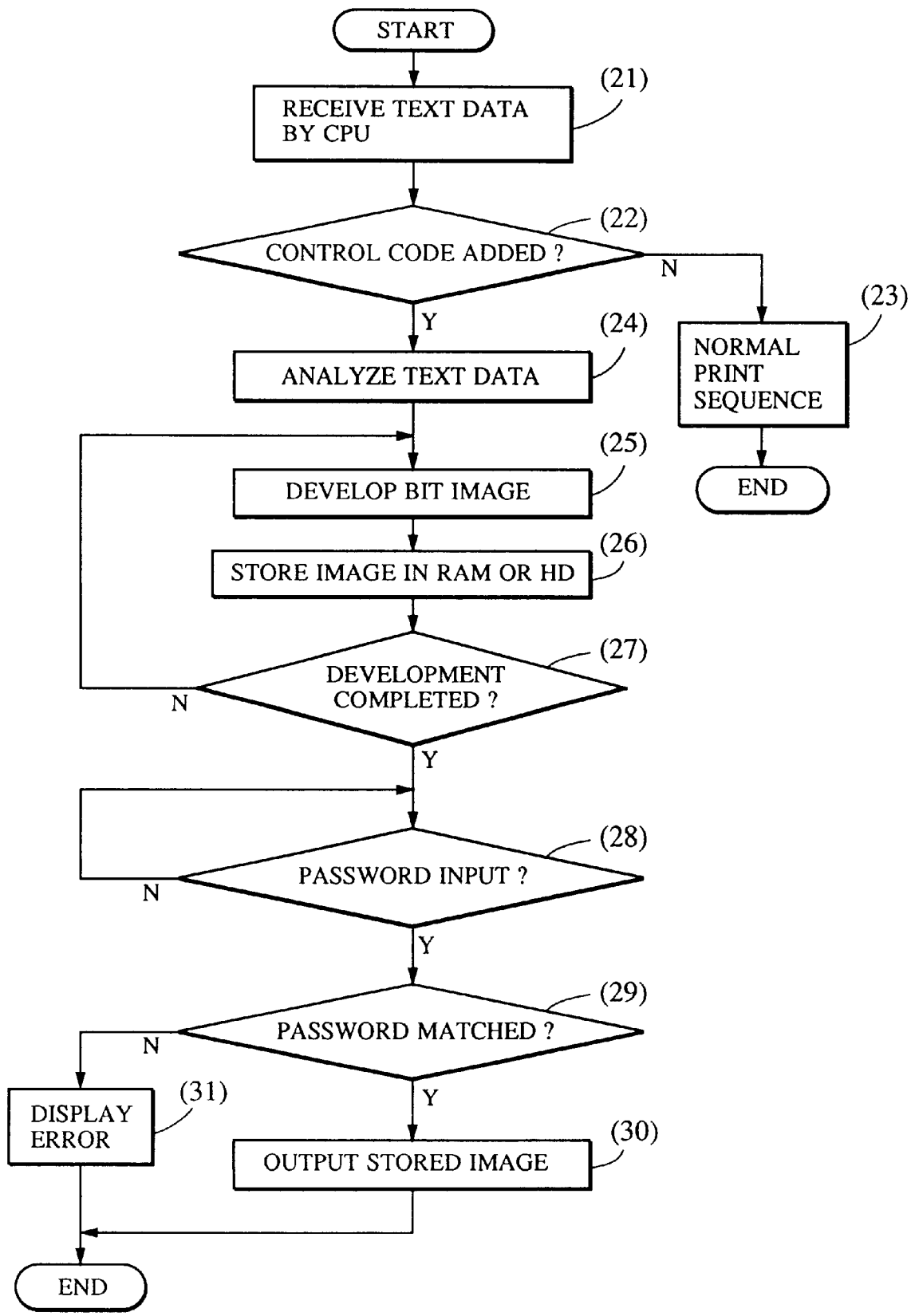
FIG. 11 is a flowchart illustrating an example of the procedure for controlling security output in a printing apparatus in accordance with the present invention.

FIG. 11 is a flowchart illustrating an example of the procedure for controlling security output of the printing apparatus in accordance with the present invention. In FIG. 11, numbers (21) to (31) each denote a step.

When the CPU receives text data from the host computer 1102 in step 21, a control code for indicating that the text data is a secret document, the user name and the password are added to the top of the text data.

The CPU makes a decision in step 22 as to whether or not the control code is added. When text data without the control code is received, the CPU performs processing by the same method as that in a conventional example in step 23.

When it is decided in step 22 that the control code has been added, the CPU analyzes the received text data in step 24, and develops the data into bit image data with reference to the font data contained in the font ROM 407 in step 25. The CPU then successively stores the developed bit image data in the RAM 408 or the HD 409 in step 26.

After it is decided in step 27 that all text data is completely developed into a bit image, the CPU displays the user name on the display panel 410 and waits for the input of the password from the key panel 411 in step 28.

In this state, however, text data can be received from any one of the personal computers 1102-1 to 1102-N connected to the network 403.

The CPU decides in step 29 whether or not the correct password has been input from the key panel 411. When it is decided that the correct password has been input from the key panel 411, the CPU outputs the whole data corresponding to the input password to the printing part 413 in step 30, as described below. When it is decided that the correct password is not input from the key panel 411, the CPU displays on the display panel 410 in step 31 that the password is wrong, and processing is terminated. At this time, the control processing below may be executed.

Namely, after a predetermined time has passed since a password error notice is displayed on the display panel, the process of printing image data received with priority to security protection is abandoned, and the received data is held in a locked state in the hard disk (HD) 409 together with the received password data (user name and password). The image data may be reproduced when lock release data and the password are input so that the load of retransfer of the same data is decreased, and data security can be protected.

The normal printing sequence is then started, and the printing operation by the printing part 413 is effected by communication with the printing part 413 through the engine interface 412. After the printing operation is completely prepared, the printing part 413 then starts to print in accordance with the image signal transmitted from the engine interface 412 while transmitting a horizontal synchronous signal to the engine interface 412. The engine interface 412 reads the bit image data from the HD 409 and transmits the image signal to the printing part 412 synchronously with the horizontal synchronous signal.

As described above, when the password is input by the user, the text data is printed out completely.

In a third embodiment, a magnetic card is read by a magnetic card reading part of the printing apparatus in place of an input of the password to the printing apparatus by the user. In other words, the user name inherent to each user is converted into magnetic intensity and previously recorded on the surface of the magnetic card, and is read by the main control part so that printing is started when the user name matches the user ID.

Figure 12:
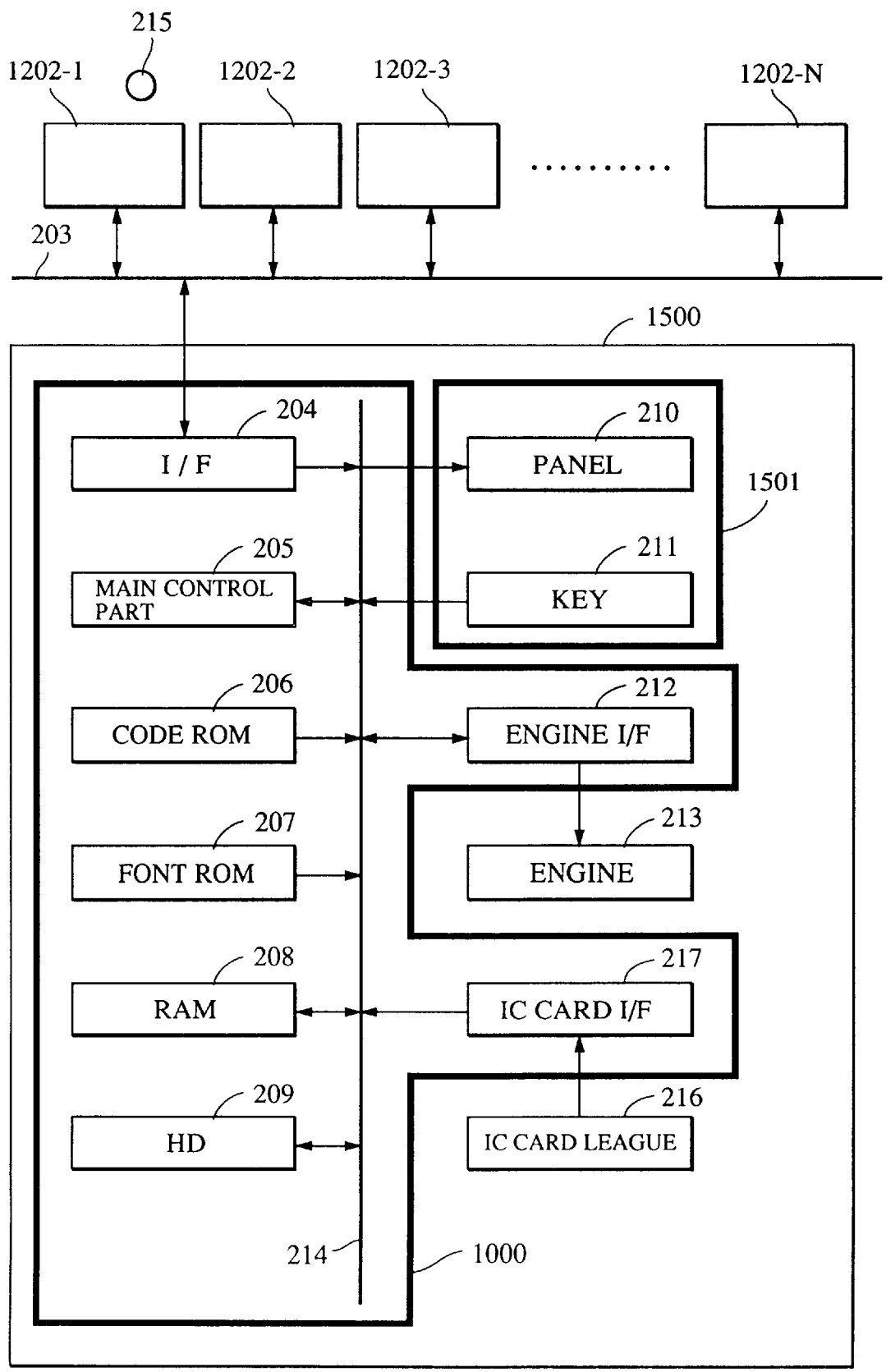
FIG. 12 is a block diagram illustrating the configuration for control of a printing apparatus in accordance with a further embodiment of the present invention.

FIG. 12 is a block diagram illustrating the control configuration of a printing apparatus in accordance with the third embodiment of the present invention.

In FIG. 12, reference numeral 1500 denotes a body of a printing apparatus; reference numeral 215, a user operating one of host computers 1202-1 to 1202-N, and reference numeral 203, a network to which a plurality of personal computers and the printing apparatus 1500 are connected.

In the printing apparatus 1500, the printer control unit 1000 comprises an input interface 204 for inputting text data from the network 203, a main control part 205 comprising a CPU and a program ROM, a code ROM 206, a font ROM 207 for storing fonts, a RAM 208 used for operating the main control part 205, a hard disk (HD) 209, a CPU bus 214 for transmitting data between the main control part 205 and each electrical device, an engine interface 212 for mediating data transmission between a CPU bus 214 and the printing part (ENGINE) 213, and a magnetic card interface 217 for transmitting the data read by a magnetic card reading part 216 to the CPU bus 214. Reference numeral 1501 denotes a console panel comprising a display panel 210 for transmitting data to the user, and a key panel 211 for transmitting data to the printing apparatus from the user.

The operation of this embodiment is now described. The user 215 operates the host computer 1202 to transmit text data to the printing apparatus 1500 from the host computer 1202. At the same time, a control code indicating that the text data is a secret document, and identifying the user name and the password are added to the top of the text data. When text data without the control code is received, the main control part 205 performs processing by the same method as that in the conventional example.

The CPU analyzes the text data and develops the data into bit image data with reference to the font data contained in the font ROM 207. The developed bit image data is successively stored in the RAM 208 or the HD 209. After the all text data is completely developed, the main control part 205 displays the user name on the display panel 210, and waits for input of the password of the user name by the magnetic card.

However, in this state, text data can be received from any one of the host computers 1202-1 to 1202-N connected to the network 203.

When the user name is verified by the magnetic card, the main control part 205 outputs data corresponding to the input user name to the printing part 213, as described below. The printing operation of the printing part 213 is first prepared by communication with the printing part 213 through the engine interface 212.

After the printing operation of the printing part 213 is completely prepared, the printing part 213 starts to print in accordance with the image signal transmitted from the engine interface 212 while transmitting a horizontal synchronous signal to the engine interface 212. The engine interface 212 reads the bit image data from the HD 209 and transmits the image signal to the printing part 213 synchronously with the horizontal synchronous signal.

As described above, the text data is completely printed out when the IC card of the user is read by the IC card reading part 216 of the printing apparatus 101.

In a fourth embodiment, a fingerprint of the user is read by the image reading part of a printing apparatus in place of input of the password to the printing apparatus by the user. Namely, the form of a fingerprint of each user is previously recorded in a fingerprint correlating part so that when a fingerprint is detected, the corresponding user name is read by the main control part. When the read user name matches the user name of the transmitted text data, printing is started.

Figure 13:
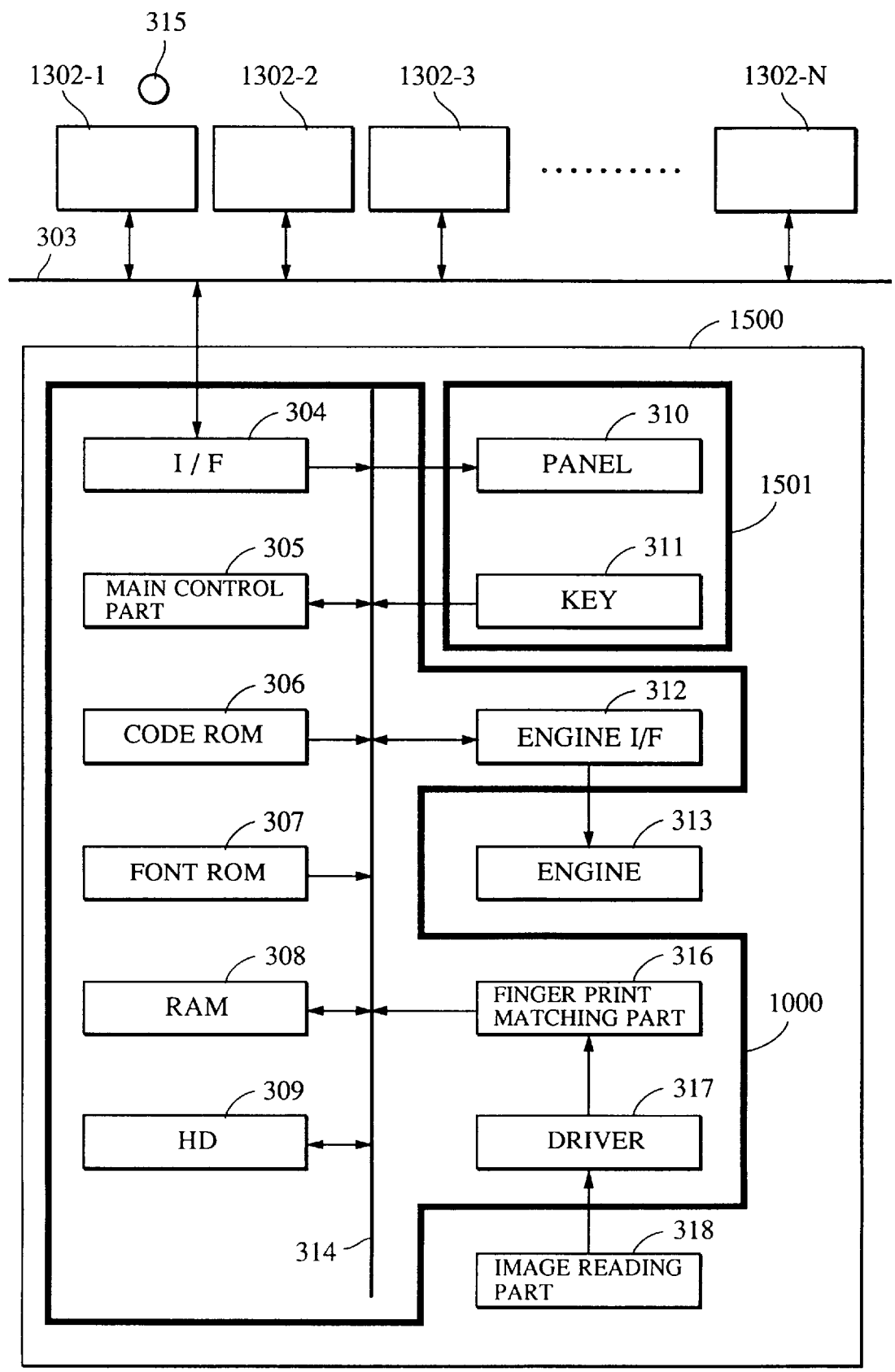
FIG. 13 is a block diagram illustrating the configuration for control of a printing apparatus in accordance with a still further embodiment of the present invention.

FIG. 13 is a block diagram illustrating the configuration for control of a printing apparatus in accordance with a fourth embodiment of the present invention.

In FIG. 13, reference numeral 1500 denotes a body of a printing apparatus; reference numeral 315, the user operating one of host computers 1302-1 to 1302-N; and reference numeral 303, a network to which a plurality of personal computers including the printing apparatus 1500 are connected.

In the printing apparatus 1500, the printer control unit 1000 comprises an input interface for inputting text data from the network 303, a main control part 305 comprising a CPU and a program ROM, a code ROM 306, a font ROM 307 for storing fonts, a RAM 308 used for operating the main control part 305, a hard disk (HD) 309, a CPU bus 314 for transmitting data between the main control part 305 and each of electric devices, an engine interface 312 for mediating data transmission between the CPU bus 314 and the printing part 313, a driver 317 for driving an image reading part 318, and a fingerprint correlating part 316 for correlating the read fingerprint image and transmitting the registered user name to the CPU bus 314.

The operation of this embodiment is described below. The user 315 operates the host computer 1302 to transmit text data to the printing apparatus 1500 from the host computer 1302. At the same time, a control code indicating that the text data is a secret document, and identifying a user name and a password are added to the top of the text data. When text data without the control code is received, the main control part 305 performs processing by the same method as that in a conventional example.

The CPU analyzes the text data and develops the data into bit image data with reference to the font data stored in the font ROM 307. The developed bit image data is successively stored in the RAM 308 or the HD 309.

After all text data is completely processed, the CPU displays the user name on the display panel 310, and waits for input of the password of the user name by the fingerprint of the user 315.

In this state, however, text data can be received from any one of the host computers 1302-1 to 1302-N connected to the network 303.

In the fingerprint correlating part 316, the image read by the image reading part 318 through the driver 317 is compared with the registered fingerprint image of the user. When it is decided that both fingerprints are the same, the corresponding user name is reported. The CPU outputs the data corresponding the reported user name to the printing part 313, as described below.

The printing operation of the printing part 313 is first prepared by communication with the printing part 313 through the engine interface 312.

After the printing operation of the printing part 313 is completely prepared, printing is started in accordance with the image signal transmitted from the engine interface 312 while transmitting a horizontal synchronous signal to the engine interface 312. The engine interface 312 reads the bit image data from the HD 309 and transmits the image signal to the printing part 313 synchronously with the horizontal synchronous signal.

As described above, text data is completely printed out when the fingerprint of the user is read by the fingerprint reading part of the printing apparatus 301.

In each of the above embodiments, a storage medium (comprising RAM having the backup function) for holding the user name or password is provided in the printing apparatus 1500, and an operation program is stored in the ROM so that the printed image data is not printed out after the transmitted text data is developed into the print image data unless the user has input the password. It is thus possible to positively prevent the sheet printed out by an unspecified user from being seen by a third person, and to permit the transmitted print data to be immediately output by a regular user.

As described above, since switching means switches the destination of the produced image data to external storage means or the printer engine on the basis of the output limiting data contained in print data, it is possible to positively prevent the produced image data from disappearing and unconditionally output even when print data is received from a host computer to produce image data.

Alternatively, since the input data is correlated with user data stored in storage means by correlation means so that control means controls start of transmission of image data to the printer engine from the external storage means on the basis of the correlation result, it is possible to positively prevent the stored image data from being printed until data indicating the start of output of the image data which has already been produced and stored without being output is input from the regular user on the printer side.

The present invention thus has the effect that, even in an environment where a plurality of host computers on a network use a common printing apparatus, security can be maintained until the regular user who transmits print data directs to start printing on the side of the printing apparatus, and the image data which has already been produced can be printed as it is after the user gives the instructions to start printing.

While the present invention has been described with respect to what is presently considered to be the preferred embodiments, it is to be understood that the invention is not limited to the disclosed embodiments. The present invention is intended to cover various modifications and equivalent arrangements included within the spirit of the appended claims.

What is claimed is:

1. A printing apparatus comprising:
 receiving means for receiving input data including page description language and discrimination information from a host computer of a computer network;
 judging means for judging whether the input data received from the host computer by said receiving means is to be printed after a manual operation;
 developing means for developing the page description language received by said receiving means in advance the manual operation;
 operation means, in case said receiving means receives a plurality of input data to be printed after said manual operation, for causing said manual operation to be carried out, said manual operation comprising inputting an instruction for selecting one input data from a plurality of input data and inputting a discrimination data of the selected input data; and
 output control means for outputting output data previously developed by said developing means after said manual operation.

2. An apparatus according to claim 1, wherein said discrimination information is a password.

3. An apparatus according to claim 2, further comprising discrimination means for discriminating, based on said discrimination information received by said receiving means, whether the discrimination data input by said operation means is correct,
 wherein said input data is designated to be printed after the manual operation when the input password is correct.

4. An apparatus according to claim 3, further comprising cancellation means for canceling the output data which is developed from the page description language by said developing means in case it is discriminated by said discrimination means that said discrimination data input by the operation means is incorrect.

5. An apparatus according to claim 4, wherein said printing apparatus stores the page description language and discrimination information corresponding to said output data in case said output data is canceled by the cancellation means.

6. An apparatus according to claim 1, wherein said output control means controls printing to discharge a printed recording media with the printed side down in case said input data is discriminated to be printed after the manual operation.

7. An apparatus according to claim 1, wherein said developing means develops said input data to be stored in a hard disc in case said input data is judged to be printed after the manual operation by said judging means.

8. An apparatus according to claim 1, further comprising a display panel to carry out the manual operation.

9. An apparatus according to claim 1, wherein said manual operation inputs said discrimination data by a magnetic card.

10. A printing method comprising the steps of:
 receiving input data including page description language and discrimination information from a host computer of a computer network;
 judging whether the received input data is to be printed after a manual operation;

developing the page description language received in advance of the manual operation;

causing the manual operation to be carried out following receipt of a plurality of input data to be printed after the manual operation, the manual operation comprising inputting an instruction for selecting one input data from a plurality of input data and inputting a discrimination data of the selected input data; and outputting output data previously developed by said developing means after said manual operation.

11. A method according to claim 10, wherein the discrimination information is a password.

12. A method according to claim 11, further comprising the step of discriminating, based on said received discrimination information, whether the input discrimination data is correct,
wherein said input data is designated to be printed after the manual operation when the input password is correct.

13. A method according to claim 12, further comprising the step of canceling the output data which is developed from the page description language when it is discriminated that the discrimination data is incorrect.

14. A method according to claim 13, further comprising the step of storing the page description language and discrimination information corresponding to said output data in cases where the said output data is canceled.

15. A method according to claim 10, wherein printing is controlled to discharge a printed recording media with the printed side down when the input data is discriminated to be printed after the manual operation.

16. A method according to claim 10, wherein the input data is stored in a hard disc when the input data is judged to be printed after the manual operation.

17. A method according to claim 10, wherein the instruction for the manual operation is input through a display.

18. A method according to claim 10, wherein said manual operation inputs the discrimination data by a magnetic card.

19. A machine readable medium storing a program for effecting the steps of:

receiving input data including page description language and discrimination information from a host computer of a computer network;

judging whether the received input data is to be printed after a manual operation;

developing the page description language received in advance of the manual operation;

causing the manual operation to be carried out following receipt of a plurality of input data to be printed after the manual operation, the manual operation comprising inputting an instruction for selecting one input data from a plurality of input data and inputting a discrimination data of the selected input data; and outputting output data previously developed by said developing means after said manual operation.

20. A machine readable medium according to claim 19, wherein the discrimination information is a password.

21. A machine readable medium according to claim 20, further comprising the step of discriminating, based on said received discrimination information, whether the input discrimination data is correct,
wherein said input data is designated to be printed after the manual operation when the input password is correct.

22. A machine readable medium according to claim 19, wherein the instruction for the manual operation is inputted through a display.

23. A machine readable medium according to claim 21, further comprising the step of canceling the output data which is developed from the page description language when it is discriminated that the discrimination data is incorrect.

24. A machine readable medium according to claim 19, wherein printing is controlled to discharge a printed recording media with the printed side down when the input data is discriminated to be printed after the manual operation.

25. A machine readable medium according to claim 19, wherein the input data is stored in a hard disc when the input data is judged to be printed after the manual operation.

26. A machine readable medium according to claim 23, wherein the program further comprises the steps of storing the page description language and discrimination information corresponding to said output data in cases where the output data is canceled.

27. A machine readable medium according to claim 19, wherein said manual operation inputs the discrimination data by a magnetic card.

28. A printing apparatus, comprising:

receiving means for receiving input data including page description language and discrimination information from a host computer of a computer network;

judging means for judging whether the input data received from said host computer by said receiving means is to be printed after a manual operation;

developing means for developing the page description language received by said receiving means in advance of the manual operation;

operation means, in case said receiving means receives a plurality of input data to be printed after said manual operation, for causing said manual operation to be carried out, said manual operation selecting one input data from said plurality of input data by specifying discrimination data which correspond to said discrimination information; and output control means for outputting input data which has been already developed by said developing means after the manual operation by said operation means.

29. An apparatus according to claim 28, wherein said discrimination information is a password.

30. An apparatus according to claim 29, further comprising discrimination means for discriminating, based on said discrimination information received by said receiving means, whether the discrimination data input by said operation means is correct,
wherein said input data is designated to be printed after the manual operation when the input password is correct.

31. An apparatus according to claim 28, further comprising cancellation means for canceling the output data which is developed from the page description language by said developing means in case it is discriminated by said discrimination means that said discrimination data input by the operation means is incorrect.

32. An apparatus according to claim 31, wherein said printing apparatus stores the page description language and discrimination information corresponding to said output data in case said output data is canceled by the cancellation means.

33. An apparatus according to claim 28, wherein said output control means controls printing to discharge a printed recording media with the printed side down in case said input data is discriminated to be printed after the manual operation.

34. An apparatus according to claim 28, wherein said developing means develops said input data to be stored in a hard disc in case said input data is judged to be printed after the manual operation by said judging means.

35. An apparatus according to claim 28, further comprising a display panel to carry out the manual operation.

36. An apparatus according to claim 28, wherein said manual operation inputs said discrimination data by a magnetic card.

37. A printing method, comprising the steps of:

receiving input data including page description language and discrimination information from a host computer of a computer network;

judging whether the input data received from said host computer is to be printed after a manual operation;

developing the page description language received in advance of the manual operation;

causing said manual operation to be carried out upon receipt of a plurality of input data to be printed after said manual operation, said manual operation selecting one input data from said plurality of input data by specifying discrimination data which corresponds to said discrimination information; and outputting input data which has been already developed by said developing means after the manual operation by said operation means.

38. A method according to claim 37, wherein the discrimination information is a password.

39. A method according to claim 38, further comprising the step of discriminating, based on said received discrimination information, whether the input discrimination data is correct, wherein said input data is designated to be printed after the manual operation when the input password is correct.

40. A method according to claim 39, further comprising the step of canceling the output data which is developed from the page description language when it is discriminated that the discrimination data is incorrect.

41. A method according to claim 40, further comprising the step of storing the page description language and discrimination information corresponding to said output data in cases where the said output data is canceled.

42. A method according to claim 37, wherein printing is controlled to discharge a printed recording media with the printed side down when the input data is discriminated to be printed after the manual operation.

43. A method according to claim 37, wherein the input data is stored in a hard disc when the input data is judged to be printed after the manual operation.

44. A method according to claim 37, wherein the instruction for the manual operation is input through a display.

45. A method according to claim 37, wherein said manual operation inputs the discrimination data by a magnetic card.

46. A machine readable medium storing a program for effecting the steps of:

receiving input data including page description language and discrimination information from a host computer of a computer network;

judging whether the input data received from said host computer is to be printed after a manual operation;

developing the page description language received in advance of the manual operation;

causing said manual operation to be carried out, upon receipt of a plurality of input data to be printed after said manual operation, said manual operation selecting one input data from said plurality of input data by specifying discrimination data which corresponds to said discrimination information; and outputting input data which has been already developed by said developing means after the manual operation by said operation means.

47. A machine readable medium according to claim 46, wherein the discrimination information is a password.

48. A machine readable medium according to claim 47, further effecting the step of discriminating, based on said received discrimination information, whether the input discrimination data is correct, wherein said input data is designated to be printed after the manual operation when the input password is correct.

49. A machine readable medium according to claim 46, further effecting the step of canceling the output data which is developed from the page description language when it is discriminated that the discrimination data is incorrect.

50. A machine readable medium according to claim 49, wherein the program further comprises the steps of storing the page description language and discrimination information corresponding to said output data in cases where the output data is canceled.

51. A machine readable medium according to claim 46, wherein printing is controlled to discharge a printed recording media with the printed side down when the input data is discriminated to be printed after the manual operation.

52. A machine readable medium according to claim 46, wherein the input data is stored in a hard disc when the input data is judged to be printed after the manual operation.

53. A machine readable medium according to claim 46, wherein the instruction for the manual operation is inputted through a display.

54. A machine readable medium according to claim 46, wherein said manual operation inputs the discrimination data by a magnetic card.

* * * * *

UNITED STATES PATENT AND TRADEMARK OFFICE
CERTIFICATE OF CORRECTION

PATENT NO. : 5,956,471

DATED : September 21, 1999

INVENTOR(S): SHIGERU UEDA, ET AL.

It is certified that error appears in the above-identified patent and that said Letters Patent is hereby corrected as shown below:

COLUMN 7:
Line 52, "can" should read --can be--.

COLUMN 10:
Line 2, "the" (3rd occurrence) should be deleted.

COLUMN 11:
Line 15, "corresponding" should read --corresponding to--.

Signed and Sealed this

Twenty-fifth Day of July, 2000

Attest:

Q. TODD DICKINSON

Attesting Officer

Director of Patents and Trademarks